United States Patent [19]

Cox et al.

[11] 4,136,282

[45] Jan. 23, 1979

[54] DIRECTIONAL DETECTOR OF GAMMA RAYS

[75] Inventors: Samson A. Cox, Downers Grove; Francis E. Levert, Chicago, both of Ill.

[73] Assignee: The United States of America as represented by the Department of Energy, Washington, D.C.

[21] Appl. No.: 855,637

[22] Filed: Nov. 29, 1977

[51] Int. Cl.² .......................... G01J 1/00; G01T 1/22; G01J 1/42
[52] U.S. Cl. .................................... 250/336; 250/370; 250/394
[58] Field of Search ............... 250/370, 371, 336, 394, 250/395, 393

[56] References Cited

U.S. PATENT DOCUMENTS

| 3,699,340 | 10/1972 | Hick et al. ........................... 250/370 |
| 4,091,288 | 5/1978 | LeVert et al. ........................ 250/370 |

Primary Examiner—Alfred E. Smith
Assistant Examiner—Janice A. Howell
Attorney, Agent, or Firm—Dean E. Carlson; Frank H. Jackson; Donald P. Reynolds

[57] ABSTRACT

A directional detector of gamma rays comprises a strip of an electrical conductor of high atomic number backed with a strip of a second electrical conductor of low atomic number. These elements are enclosed within an electrical conductor that establishes an electrical ground, maintains a vacuum enclosure and screens out low-energy gamma rays. The detector exhibits a directional sensitivity marked by an increased output in the favored direction by a factor of ten over the output in the unfavored direction.

3 Claims, 4 Drawing Figures

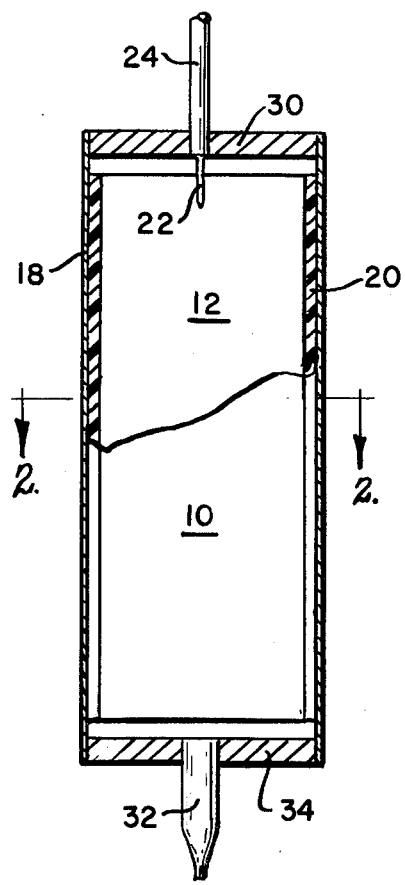
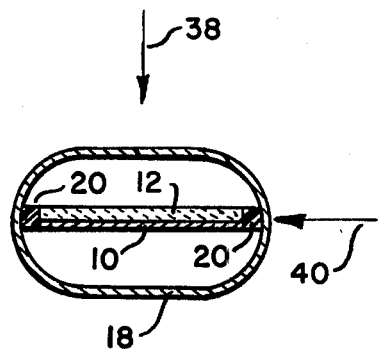
FIG 1
FIG 2

DIRECTIONAL DETECTOR OF GAMMA RAYS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to the detection of gamma rays in the core of a nuclear reactor.

There are many well-known means for the detection of gamma rays. However, most of these are either insensitive to the direction of incident gamma rays or else require an extensive length of detector or collimator or both to establish such a directional sensitivity. The fast-neutron hodoscope which includes gamma detectors in each of a number of detection channels is an example of the type of detector that is preceded by a collimator to attenuate all gammas except those proceeding in a favored direction. The collimator in the fast-neutron hodoscope is of the order of meters in length.

It would be useful to have a detector of gamma rays that would identify their energy and direction and that would also be small enough to permit insertion into a measuring region such as the interior of a nuclear reactor. Isotropic detectors exist that are sufficiently small but they are not directional. It would also be useful if the preferred direction could be varied at a measuring region that is sufficiently small in geometric extent to be considered a point or a line.

It is an object of the present invention to provide a method and means of detecting gamma rays that is sensitive to their direction.

It is a further object of the present invention to make a small directional gamma detector.

Other objects will become apparent in the course of a detailed description of the invention.

SUMMARY OF THE INVENTION

A directional detector of gamma rays comprises a strip of an electrical conductor of relatively high atomic number backed by a second strip of an electrical conductor of relatively low atomic number. The strips are surrounded by a cylindrical vacuum enclosure that establishes an electrical ground. The passage of gamma rays through the strips generates Compton and photoelectrons, some of which escape and induce a current in the strips. Gamma rays incident on the face of the electrode with the higher atomic number material produce a greater signal than do gamma rays incident on the side with lower atomic number.

BRIEF DESCRIPTION OF THE DRAWINGS

FIG. 1 is a sectional side view of the detector of the present invention.

FIG. 2 is a cross-sectional end view of the detector of FIG. 1 taken along section lines 2—2.

DETAILED DESCRIPTION OF THE INVENTION

Figure 3:
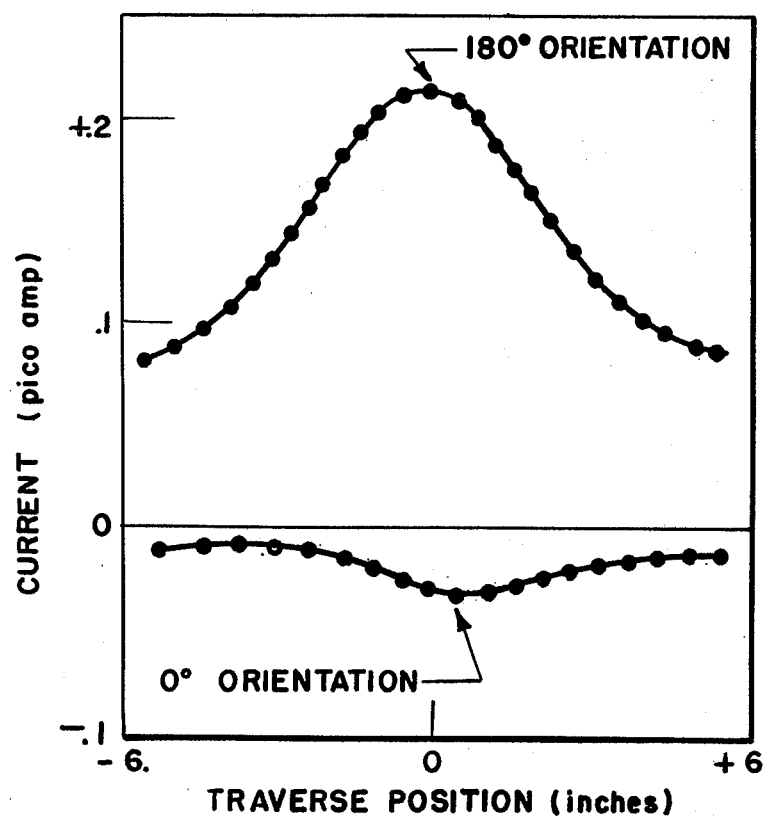
FIG. 3 is a plot of the signal received from the detector as a source of gamma rays is moved past it.

FIG. 1 is a sectional side view of the gamma detector of the present invention and FIG. 2 is a sectional end view of the detector along section lines 2—2 of FIG. 1. In FIGS. 1 and 2, radiator strip 10 is made of an electrical conductor that is backed by conducting strip 12. It will be shown that it is desirable to have the ratios of the atomic masses of the materials of strips 10 and 12 such that radiator strip 10 is high in comparison with conducting strip 12 so that their photoelectric cross-sections are in corresponding ratio. This can be accomplished by making radiator strip 10 of lead and conducting strip 12 of graphite, although other choices can obviously be made according to the rule stated. Conducting strip 12 is maintained in place within case 18 by means such as a metallized ceramic insulator 20 which is bonded to the strip and to the container wall. The ceramic serves to insulate the conducting strip electrically from the container wall.

Radiator strip 10 is connected electrically by connector 22 to coaxial connector 24. The shield side of coaxial connector 24 is connected electrically to case 18 through end cap 30. A partial vacuum of the order of 1 micron is established inside case 18 by pumping through tube 32 which is connected to end cap 34 and is sealed by pinching after a satisfactory vacuum is achieved.

Operation of the apparatus of FIGS. 1 and 2 will now be explained in terms of the incidence of gamma rays from two directions, as indicated by arrows 38 and 40. Arrow 38 is incident upon the broad side of conducting strip 12 and arrow 40 is incident on the narrow side of conducting strip 12. It can be seen that a gamma ray proceeding in a direction of arrow 38 or the opposite direction will pass through the junction of radiator strip 10 and conducting strip 12. The largest area of this junction is exposed in the direction of arrow 38. It is well known that the incidence of gamma rays on a conductor such as radiating strip 10 or conducting strip 12 causes electrons to be freed as a result of three processes, the photoelectric effect, the Compton effect and pair production. The number of electrons resulting from pair production is normally small in comparison with those produced by the other two processes and Compton electrons can be minimized in the detector because gammas that pass through conducting strip 12 and radiator strip 10 are self-canceling. The Compton cross section is a direct function of the nuclear charge and the range of the electrons varies inversely as the nuclear charge which leads to a tendency to cancel the effects of Compton electrons. Those electrons produced by the photoelectric effect in radiator strip 10 and conducting strip 12 are emitted from radiator strip 10 and collected by case 18 to constitute the current that is measured. In particular, the production of photoelectrons electrons is a function of the fifth power of the atomic number of the material in which photoelectrons are produced by gamma rays. For this reason, lead is much more efficient in producing photoelectrons than graphite. The principle of operation of the gamma ray detector is based on the experimental observation that the production of electrons from the surface of a material due to incident gamma rays is more strongly peaked in the direction of the incident gamma ray for low atomic number materials than for high atomic number materials. Another way of stating this effect is that for low atomic number materials the backscattered electron intensity is much smaller than the forward scattered electron intensity while for high atomic number materials the forward and backscattered intensities are not greatly different. As a result of this process, an electrode which consists of a layer of high and a layer of low atomic number material will exhibit a greater sensitivity to gamma rays incident on the high atomic number material than for gamma rays incident on the low atomic number material.

Figure 4:
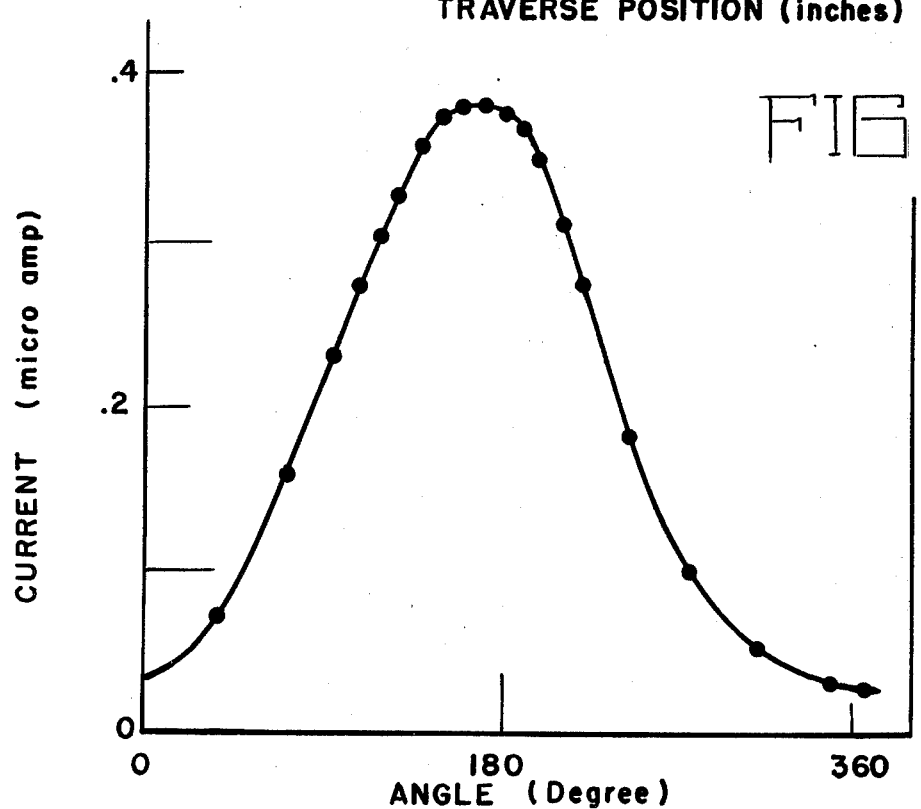
FIG. 4 is a plot of output as a function of angular position for the detector of FIG. 1 when rotated in position in a nuclear reactor.

Several detectors for the practice of the present invention have been built and used at the Argonne National Laboratory. In one such detector, a graphite plate ⅛ inch in thickness was bonded to a lead sheet 0.020 inch thick. The detecting electrodes were approximately 3 inches long and were contained in a bias electrode that was ⅜ inch stainless steel. The case was 1¾ inch diameter stainless steel tubing. The coaxial connectors used to bring out signals were both BNC fittings adapted to maintain vacuum seals and the inside of the detector was pumped to a vacuum of the order of 1 micron. Test results of two kinds obtained on such a detector are shown in FIGS. 3 and 4. FIG. 3 is a plot of the electrical output obtained from the detector when it was placed in two orientations differing by 180 degrees and an isotropic source of fission-spectrum gamma rays was moved past the detector in a straight line. The source was the Argonne Thermal-Source Reactor (ATSR). FIG. 4 is a plot of the output of an equivalent such detector that was placed in an essentially unidirectional flux of gamma rays in the ATSR and rotated in position through 360 degrees. In each case, the peak in output is achieved when the lead electrode is normal to the incident gamma radiation.

The embodiments of the invention in which an exclusive property or privilege is claimed are defined as follows:

1. A directional detector of gamma rays comprising a first strip of an electrical conductor of high atomic number, a second strip of an electrical conductor of a low atomic number disposed parallel to the first strip and bonded thereto in physical and electrical contact therewith, an electrode coaxial with the first and second strips, means for maintaining a vacuum inside the detector, means for completing an electrical circuit between the conducting strips and the electrode, and means for measuring the electric current in the circuit.

2. The apparatus of claim 1 wherein the first strip is lead and the second strip is graphite.

3. The apparatus of claim 1 wherein the vacuum is at least 1 micron of mercury.

* * * * *